Sept. 24, 1963  V. M. SPARKMAN  3,104,491
READING STAND
Filed July 6, 1959  2 Sheets-Sheet 1
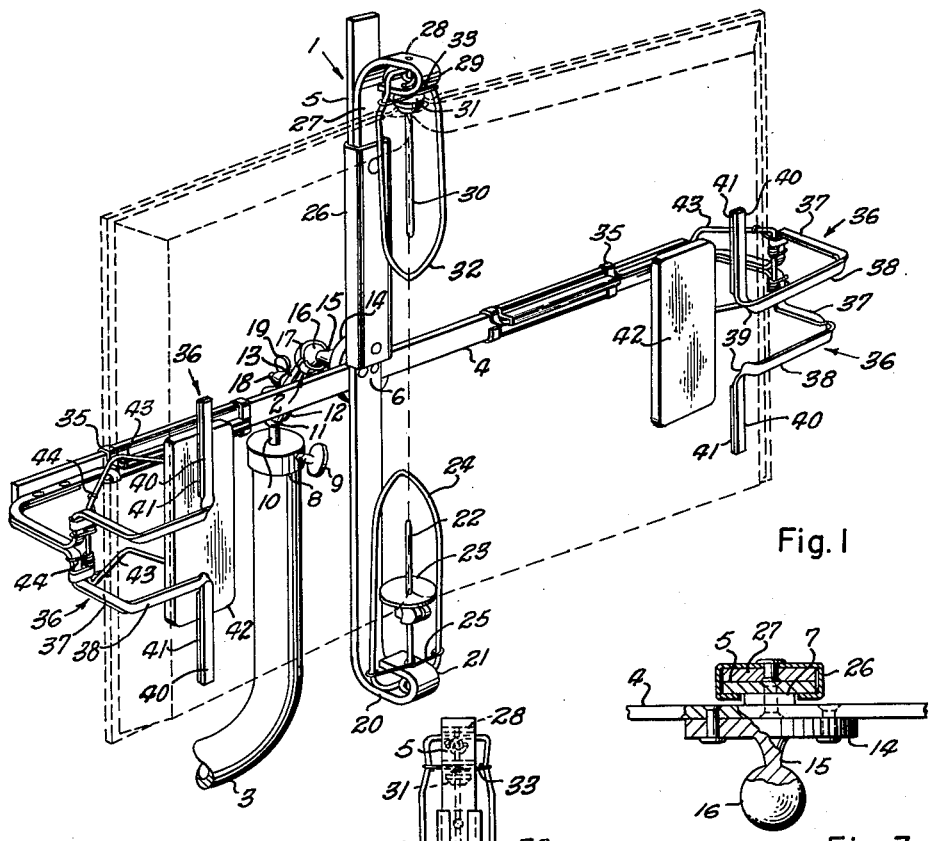
Fig. 1
Fig. 3
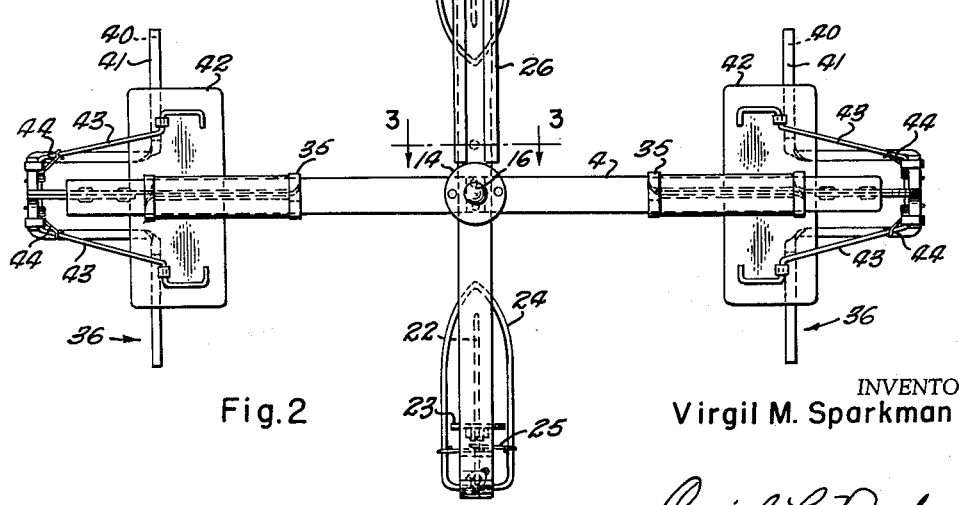
Fig. 2
INVENTOR
Virgil M. Sparkman
BY
ATTORNEY Sept. 24, 1963      V. M. SPARKMAN      3,104,491
READING STAND Filed July 6, 1959      2 Sheets-Sheet 2

INVENTOR
Virgil M. Sparkman

BY Cecil L. Dowd

ATTORNEY

United States Patent Office 3,104,491
Patented Sept. 24, 1963

3,104,491
READING STAND
Virgil M. Sparkman, 1301 Marshalldale, Arlington, Tex.
Filed July 6, 1959, Ser. No. 825,271
5 Claims. (Cl. 45—58)

This invention relates to a reading stand, and it concerns more particularly a reading stand including a holder for a book, magazine, or other reading matter having means for adjusting it to suit the convenience of the reader.

An object of the invention is to provide a reading stand which is peculiarly adapted for the use of patients when in a reclining position, and for those who cannot conveniently hold the book or other reading matter and turn the leaves as reading progresses.

Another object of the invention is to provide, in a reading stand, a book holder having means for supporting a book, magazine, or other reading matter with the leaves and backs thereof in extended, flat positions, for reading therefrom.

Another object of the invention is to provide, in a reading stand, a book holder having means for positively securing a book, magazine or other reading matter in open position, with selected leaves in position for reading therefrom, while at the same time permitting the leaves to be turned readily with a single hand, or with one or more fingers thereof.

Another object of the invention is to provide, in a reading stand, a book holder having means whereby a book, magazine, or other reading matter may be readily secured thereto, in position for reading therefrom.

Another object of the invention is to provide, in a reading stand, a simple and compact book holder which is adapted to hold books while open, and is adjustable to books of different sizes.

Another object of the invention is to provide, in a reading stand, a book holder which is of simple, rugged construction, may be manufactured inexpensively, and is efficient in operation and durable in use.

While the reading stand of the invention has been designed primarily for disabled patients, it is capable of general use for the convenience of readers either in reclining or sitting position.

The invention will be readily understood by referring to the following description and the accompanying drawing, in which:

FIGURE 1 is a perspective view of a reading stand including a book holder embodying the invention, showing fragmentarily a support therefor, and showing in dotted lines a book secured to the holder in position for reading therefrom.

FIGURE 2 is a rear elevational view of the book holder.

FIGURE 3 is a fragmentary plan view, partly in section taken on the line 3—3 of FIGURE 2.

Figure 4:
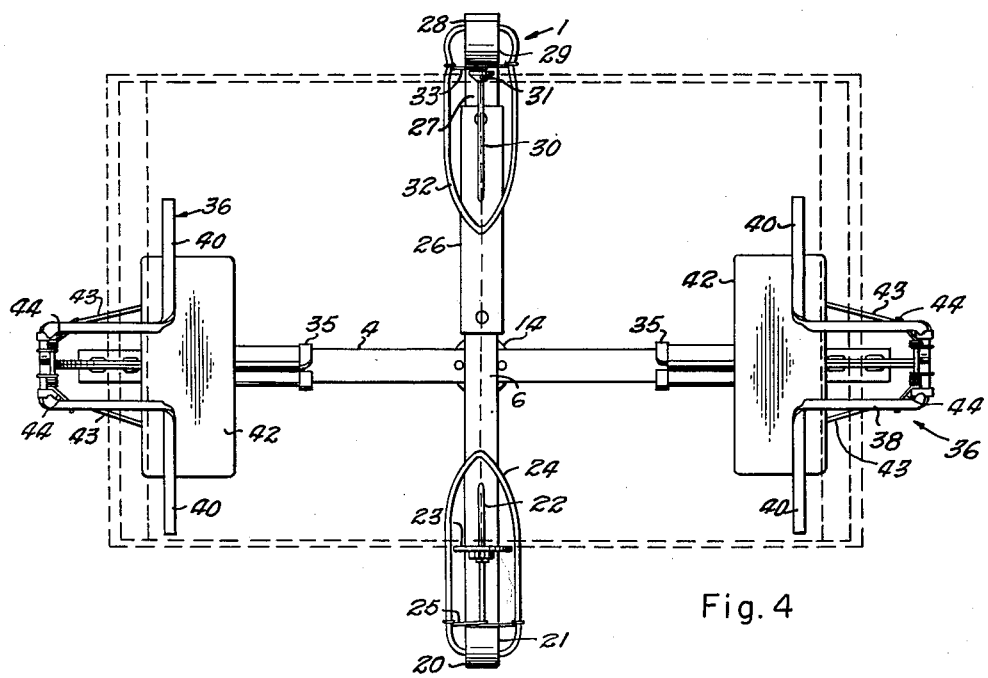
FIGURE 4 is a front elevational view.
Figure 5:
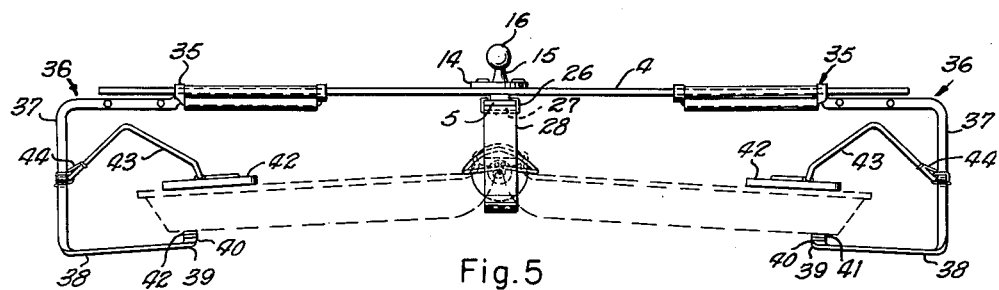
FIGURE 5 is a top plan view.

Referring to FIGURE 1 of the drawing, the numeral 1 designates generally a book holder embodying the invention, and the numeral 2 indicates a support therefor, which is shown fragmentarily, and which may be of any suitable construction. As shown, the support 2 includes an angularly bent, horizontally and upwardly extending tubular element 3, which advantageously may be connected to a suitable standard (not shown) adapted to be supported on any convenient supporting surface, such as the floor.

The book holder 1 includes a frame consisting of a pair of elongated, generally flat bars 4 and 5, which are crossed intermediate their ends and are rigidly connected at their juncture, as at 6, in spaced apart relation to each other. The bar 4 is positioned rearwardly of the bar 5, and normally extends horizontally, while the bar 5 normally extends vertically. A small rectangular spacer element 7, which is narrower than the vertically extending front bar 5, is disposed between the crossed bars 4 and 5 at their juncture 6.

A cap 8, which is connected to the upper end of the tubular element 3 by a set screw 9, has an upstanding pin 10 formed integrally therewith. A ball 11, which is formed on the upper end of the pin 10, is received in a socket 12 formed in one end of a split sleeve 13.

A disc 14, which is positioned rearwardly of the crossed bars 4 and 5 and is attached thereto at their juncture 6, has an integral lug 15 which extends rearwardly therefrom. A ball 16, which is formed on the rear end of the lug 15, is received in a socket 17 in the end of the split sleeve 13 opposite the socket 12.

The sockets 12 and 17 are adapted to be clamped about the balls 11 and 16 by means of a screw 18, which extends transversely through the split sleeve 13 intermediate its ends and has a wing nut 19 applied thereto, whereby the frame consisting of the crossed bars 4 and 5 may be adjustably positioned relative to the supporting element 3.

The vertically extending bar 5 is bent forwardly substantially at right angles adjacent its lower end, as at 20, and the forwardly extending portion thereof is folded upwardly on itself, as at 21.

An upstanding pin 22, the lower end of which extends across and is passed through aligned openings in the folded end portion 21 of the bar 5, and is rigidly secured thereto, is engageable between the leaves of a book, adjacent the binding thereof, beginning at its lower edge.

A circular enlargement 23, which surrounds the pin 22 and is secured thereto intermediate its ends, is adapted to abut the lower edge of the book, whereby the book is supported thereon.

A bent wire loop 24, an end portion of which is coiled about the lower end of the pin 22, and the sides of which normally extend upwardly on opposite sides of the pin 22 and are additionally secured thereto by a wire 25, is adapted to yieldably engage the outer surface of the book cover, intermediate its sides and adjacent its lower edge, whereby the book is additionally supported thereon.

A slide 26, which is formed by an angularly bent metal plate, embraces the vertically extending bar 5 and is adjustable longitudinally relative thereto. The slide 26 is adapted to straddle the spacer element 7. An elongated, generally flat bar 27, which is attached to the inner surface of the slide 26 and extends upwardly therefrom, slidably engages the bar 5. The bar 27 is bent forwardly substantially at right angles adjacent its upper end, as at 28, and the forwardly extending portion thereof is folded downwardly on itself, as at 29.

A depending pin 30, the upper end of which extends across and is passed through aligned openings in the folded end portion 29 of the bar 27, and is rigidly secured thereto, is engageable between the leaves of a book, adjacent the binding thereof, beginning at its upper edge.

A circular enlargement 31, which surrounds the pin 30 and is secured thereto intermediate its ends, is adapted to abut the upper edge of the book, whereby vertical displacement of the book relative thereto is prevented.

Figure 6:
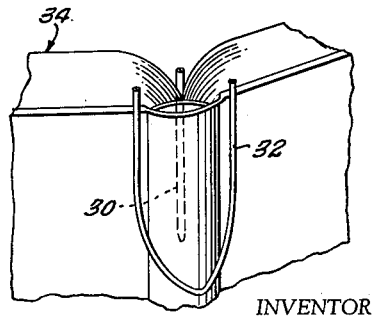
FIGURE 6 is a fragmentary perspective view of a book, showing the manner in which the book is attached to the holder.

A bent wire loop 32, an end portion of which is coiled about the upper end of the pin 30, and the sides of which normally extend downwardly on opposite sides of the pin 30 and are additionally secured thereto by a wire 33, is adapted to yieldably engage the outer surface of the book cover, intermediate its sides and adjacent its upper edge, as shown in FIGURE 6, whereby the book is additionally supported thereon. In FIGURE 6 the book is designated generally by the numeral 34.

A pair of slides 35, which are formed of comparatively stiff wire, embrace the horizontally extending bar 4 and are adjustable longitudinally relative thereto. Two pairs of elongated wire fingers 36, which form longitudinal extensions of the respective slides 35, extend beyond opposite ends thereof. The fingers 36 are bent forwardly intermediate their ends, as at 37, and the forwardly extending portions thereof are bent horizontally inwardly, as at 38, and then vertically outwardly, in opposite directions, as at 39. The end portions 40 of the fingers 36 have padded surfaces 41 for frictional engagement with the leaves of an open book, adjacent opposite sides thereof.

A pair of planar supporting elements 42, one of which is positioned in opposed relation to the end portions 40 of the fingers 36 of each pair, rearwardly thereof, are each pivotally connected to the adjacent ends of a pair of arms 43, which are formed of a single piece of angularly bent wire, and are pivotally connected at their opposite ends to the fingers 36 of one pair.

The arms 43 of each pair are acted on by a spring 44 whereby the supporting elements 42 are adapted to be biased in clamping engagement with the backs of a book, in an open position thereof, and the book is capable of being yieldably secured between the respective pairs of fingers 36 and the corresponding supporting elements 42.

In use, the leaves of a book supported on the holder 1 may be turned by depressing the leaves and back comprising one side of the book, in an open position thereof, whereby the corresponding supporting element 42 is depressed also, and the leaf to be turned is spaced apart from the end portions 40 of the fingers 36 of the adjacent pair.

The fingers 36 of each pair are spaced apart, whereby the opposed surfaces of the leaves of a book supported on the holder 1 are readily accessible, for convenience in turning them.

Figure 7:
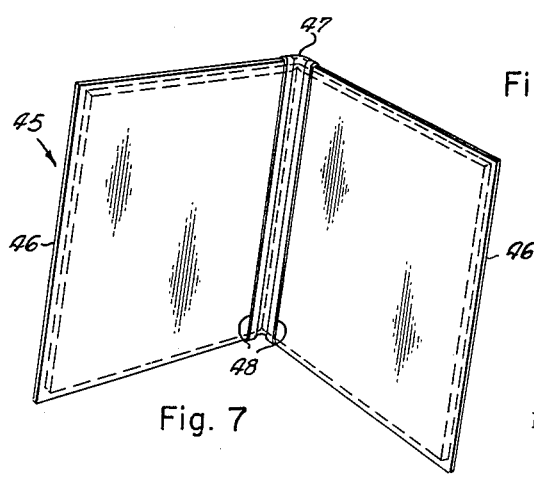
FIGURE 7 is a perspective view of a protective covering for magazines which advantageously may be used in conjunction with the holder.

Referring to FIGURE 7, the numeral 45 designates generally a protective covering for magazines which advantageously may be used in conjunction with the holder of this invention. The covering 45 is of a conventional type which is commonly employed in library files and the like, and includes a pair of backs 46, which advantageously may be comparatively stiff, a flexible strip 47 which connects the backs 46, and a pair of elastic or metal strips 48 which are connected at their ends to the respective backs 46 and are engageable between the leaves of a magazine adjacent its binding.

The invention may be modified in various ways without departing from the spirit and scope thereof.

What is claimed is:

1. In a device for holding an open book in reading position having a frame comprising a vertical bar and a horizontal bar rigidly connected intermediate their ends, and means on each end of said vertical bar for securing a book thereto, the combination of an angular page holder element arranged on each end of said horizontal bar and adjustable longitudinally thereof, each of said page holder elements rigidly extending outwardly at right angles from said horizontal bar and inwardly in opposing arrangement with respect to the other, fixed page engaging means on the inner surfaces of each of said elements, and a spring tensioned supporting element opposing each of said page holder elements for yieldably engaging the covers of a book and biasing the pages thereof against said page engaging means.

2. In a holder for an open book for reading having a pair of rigidly connected frame members in transverse vertical and horizontal relationship, the said vertical member having a book rest formed on its lower end and an adjustable tensioned element on its upper end engageable with a book binding to support an open book, the combination of a page engaging element extensibly attached to each end of said horizontal bar and having fixed angular end portions spaced outwardly from said frame members, and means connected to each of said page engaging elements for engaging the covers of a book, and yieldable when depressed, to bias the pages of a book on said frame outwardly against said page engaging elements.

3. In a holder device for an open book having a normally vertical bar formed with a substantially angular portion on its lower end and extending forwardly of said bar and adapted to support a book, a yieldable element on said angular portion for engaging the back of said book, a corresponding angular portion at the top of said bar and slidable longitudinally thereof for adjustment with respect to said lower angular portion, a corresponding yieldable element on the said upper angular portion for engaging the back of a book, and a horizontal bar arranged transversely of said vertical bar and rigidly secured thereto intermediate its ends, the combination of leaf engaging members slidably attached to each end of said horizontal bar and rigidly projecting forwardly therefrom and extending toward each other in opposing relation, and a spring tensioned element hinged to each of said leaf engaging members and positioned rearwardly thereof in cooperative relation therewith and yieldably engageable with the covers of a book opposite said leaf engaging members whereby the pages of a book are held against said leaf engaging members.

4. In combination with a support therefor, the combination of a book holder having clamping means including a ball and socket joint providing an adjustable connection whereby the book holder is adjustably and removably connected to said support for rotative adjustment in any direction relative thereto, the book holder consisting essentially of a first elongated flat bar and a second elongated flat bar which are crossed intermediate their ends and rigidly connected in spaced apart relation to each other, the first and second bars extending horizontally and vertically, respectively, the second bar being positioned forwardly of the first bar and the first and second bars being rigidly connected at their juncture, rearwardly of the first bar, to an element of said ball and socket joint, a third elongated flat bar arranged in parallel, juxtaposed relation to the second bar and having means connecting it in slidable, frictional engagement therewith whereby the second and third bars are adjustable longitudinally relative to each other, the second bar having a forwardly extending lower end portion and the third bar having a forwardly extending upper end portion, an upstanding pin connected at its lower end to the forwardly extending lower end portion of the second bar and a depending pin connected at its upper end to the forwardly extending upper end portion of the third bar, said pins being engageable between the leaves of a book adjacent its binding and having abutments thereon engageable with the lower and upper edges thereof, respectively, spring tensioned means connected to the forwardly extending portions of the second and third bars engageable with the covers of a book on opposite sides of said pins, a pair of slide elements received on opposite end portions of the first bar, in slidable, frictional engagement therewith, whereby said slide elements are adjustable longitudinally relative to the first bar, forwardly and horizontally inwardly extending means rigidly connected to said slide elements engageable with opened pages of a book adjacent their opposite side edges, and spring tensioned means pivotally connected to intermediate portions of said forwardly and horizontally inwardly extending means engageable with the covers of a book adjacent their opposite side edges whereby said covers are biased forwardly.

5. In combination with a support therefor, the combination of a book holder having clamping means including a ball and socket joint providing an adjustable connection whereby the book holder is adjustably and removably connected to said support for rotative adjustment in any direction relative thereto, the book holder consisting essentially of a first elongated flat bar and a second elongated flat bar which are crossed intermediate their ends and rigidly connected in spaced apart relation to each other, the first and second bars extending horizontally and vertically, respectively, the second bar being positioned forwardly of the first bar and the first and second bars being rigidly connected at their juncture, rearwardly of the first bar, to an element of said ball and socket joint, a third elongated flat bar arranged in parallel, juxtaposed relation to the second bar and having means connecting it in slidable, frictional engagement therewith whereby the second and third bars are adjustable longitudinally relative to each other, the second bar having a forwardly extending lower end portion and the third bar having a forwardly extending upper end portion, an upstanding pin connected at its lower end to the forwardly extending lower end portion of the second bar and a depending pin connected at its upper end to the forwardly extending upper end portion of the third bar, said pins being engageable between the leaves of a book adjacent its binding and having abutments thereon engageable with the lower and upper edges thereof, respectively, spring tensioned means connected to the forwardly extending portions of the second and third bars engageable with the covers of a book on opposite sides of said pins, a pair of slide elements received on opposite end portions of the first bar, in slidable, frictional engagement therewith, whereby said slide elements are adjustable longitudinally relative to the first bar, two pairs of angularly bent elongated members, one pair of which is rigidly connected to each of the slide elements and extend forwardly and horizontally inwardly therefrom, engageable with opened pages of a book adjacent their opposite side edges, the end portions of said angularly bent elongated members opposite the respective slide elements being spaced apart and extending vertically in opposite directions, a pair of vertically disposed planar members positioned forwardly of the respective slide elements, between the slide elements and the opposite end portions of the corresponding angularly bent elongated members, for engagement with the covers of a book adjacent their opposite side edges, said planar members each being pivotally connected to one end of each of a pair of arms which are pivotally connected at their opposite ends, respectively, to forwardly extending portions of said angularly bent elongated members intermediate their ends, in vertically spaced relation to each other, whereby said planar members and said arms are movable pivotally about a vertical axis, and spring means on said angularly bent elongated members acting on said arms whereby they are biased forwardly about their pivots.

References Cited in the file of this patent

UNITED STATES PATENTS

| | | |
|---|---|---|
| 959,735 | Hancock | May 31, 1910 |
| 1,038,280 | Burnett | Sept. 10, 1912 |
| 1,200,744 | Marjoram | Oct. 10, 1916 |
| 2,333,353 | Zanella | Nov. 2, 1943 |
| 2,480,233 | Fuller | Aug. 30, 1949 |